United States Patent [19]

Tsuchiya

[11] Patent Number: 5,363,286
[45] Date of Patent: Nov. 8, 1994

[54] HIGH VOLTAGE GENERATOR

[75] Inventor: Akira Tsuchiya, Otawara, Japan

[73] Assignee: Kabushiki Kaisha Toshiba, Kawasaki, Japan

[21] Appl. No.: 995,710

[22] Filed: Dec. 23, 1992

[30] Foreign Application Priority Data

Dec. 25, 1991 [JP]  Japan .................. 3-343488

[51] Int. Cl.$^5$ .............................. H02M 7/06
[52] U.S. Cl. ............................ 363/8; 363/61;
   363/144; 363/146; 378/104; 378/105
[58] Field of Search .............. 363/8, 61, 126, 144,
   363/145, 146; 378/101, 102, 104, 105

[56] References Cited

U.S. PATENT DOCUMENTS

| Re. 31,119 | 1/1983 | Mitani et al. | 363/126 |
|---|---|---|---|
| 3,745,438 | 7/1973 | Saeki | 363/126 |
| 3,936,719 | 2/1976 | Miyoshi et al. | 363/126 |
| 4,204,263 | 5/1980 | Onoue | 363/126 |
| 4,229,787 | 10/1980 | Thibodeau | 363/146 |
| 4,247,889 | 1/1981 | Riechmann | 363/126 |
| 4,271,463 | 6/1981 | Tanimura et al. | 363/126 |
| 4,293,903 | 10/1981 | Mochida et al. | 363/146 |
| 4,527,229 | 7/1985 | Imamura et al. | 363/126 |
| 4,601,051 | 7/1986 | Santurtun et al. | 378/105 |
| 5,060,253 | 10/1991 | Jedlitschka et al. | 378/101 |

*Primary Examiner*—Jeffrey L. Sterrett
*Attorney, Agent, or Firm*—Oblon, Spivak, McClelland, Maier & Neustadt

[57] ABSTRACT

A high voltage generator comprises a transformer unit for boosting an inputted AC voltage and a rectifier unit for rectifying the AC voltage boosted by the transformer unit, the transformer unit and the rectifier unit being assembled as high voltage components, wherein the high voltage components are molded by a solid insulation material with the high voltage components being separated from each other by a predetermined distance to thereby form the high voltage components to a single block member. An electric conductive layer is formed on an outside surface of the block member. The high voltage generator is utilized for an X-ray generator and a DC high voltage output generated from the rectifier unit serves as a power supply for generating X-rays. A filament heating transformer is further disposed as a high voltage component for supplying an AC power for heating filaments of the X-ray tube. A high voltage cables are connected to an output side of the rectifier unit and portions of ends of the high voltage cables on a rectifier unit side are directly embedded in the solid insulation material. The solid insulation material is an epoxy resin, a phenol resin, a silicone resin, a urea resin or the like.

26 Claims, 5 Drawing Sheets

HIGH VOLTAGE GENERATOR

BACKGROUND OF THE INVENTION

The present invention relates to a high voltage generator for generating a DC high voltage by boosting an AC voltage supplied at a low voltage and then rectifying the boosted voltage.

A high voltage generator generally having a structure shown in FIG. 5 known as a conventional high voltage generation apparatus, which is used to supply a high voltage, e.g. 150 kV, to an X-ray tube for a medical X-ray diagnosis apparatus, for example.

A high voltage generator shown in FIG. 4 as a circuit diagram includes, as high voltage components, a high voltage transformer 101 connected to input terminals $IN_1$, and $IN_2$, a high voltage rectifier 102 connected to the high voltage transformer 101 and three-pole output terminals $OUT_1$, and $OUT_2$, and a filament heating transformer 103 connected to other input terminals $IN_3$–$IN_6$ and the output terminal $OUT_2$. With this arrangement, an AC low voltage, e.g. 200 V, supplied to the input terminals $IN_1$ and $IN_2$ is transformed to a DC high voltage, e.g. 150 kV, and is supplied between the anode and filament of an X-ray tube 105 from the output terminals $OUT_1$, and $OUT_2$ through three-core high voltage cables 104, 104. Further, two focusing filaments of the X-ray tube 105 are heated by an AC voltage taken out from the output terminal $OUT_2$. The AC voltage supplied to the input terminals $IN_1$, and $IN_2$ may be made to a high frequency by an optional inverter or high frequency converter 121 and in this case, the size and weight of the high voltage transformer 101 itself can be reduced.

These high voltage components are assembled as shown in FIG. 5. That is, the high voltage components 101, 102 and 103 are supported by support members 107, 107, - - - 107 and are assembled and then accommodated in a vessel 108 made of iron. Then after the interior of the vessel 108 has been dried, insulation oil 109 is supplied to the vessel 108 to insulate between the respective components.

When, however, even a slight amount of dust, water and metal powder float in the insulation oil 109, a dielectric strength may be lowered due to the convection of the foreign substances. Thus, as shown in FIG. 5, in the conventional technology, barriers 110, 110, - - - 110 each composed of an insulation material board are disposed between the components to restrict the convection of the foreign substances.

The output terminals $OUT_1$, and $OUT_2$ are actually composed of high voltage receptacles 111, 111 as shown in FIG. 5. Although each of the high voltage receptacles 111 includes a high voltage electrode unit and a ground unit, a predetermined insulation distance is provided between the high voltage electrode unit and the ground unit to prevent the occurrence of creeping discharge.

Further, as shown in FIG. 5, the high voltage receptacles 111, 111, the terminal tables 112, 112, - - - 112, constituting the input terminals $IN_1$,- - - $IN_6$, and the like are mounted on an upper cover 113. Low voltage cables 114, 114, - - - 114 are mounted to the terminal tables 112, 112, - - - 112, respectively.

Nevertheless, in the high voltage generator of the conventional structure described above, when the barriers are formed, the inside structure or components of the vessel is made complex. A sufficient factor of safety cannot help being employed for the distance between the respective high voltage components, by taking the deterioration of the insulation oil into consideration, and as a result, the space between the high voltage components is increased. In the same way, the high voltage receptacle must have an insulation distance set by taking a sufficient factor of safety into consideration. For these reasons, the conventional high voltage generator having the arrangement to achieve a dielectric strength by the insulation oil has a problem of large size and complex structure as a whole generator.

In addition, in the case of the inverter type high voltage generator, in which pulses are controlled by a frequency-variable inverter circuit, a problem arises in that the size and weight of the high voltage transformer itself is reduced by using a high frequency, the dielectric strength of the insulation oil is the same, and thus, the reduction of the size and the weight is naturally limited to achieve a predetermined dielectric strength. Therefore, a problem also arises such that the generator must have a certain degree of size and weight, thus requiring an ensurance of a large insulation space.

Furthermore, when the conventional high voltage generator is used by being mounted on the support frame of an X-ray CT (cathode tube) apparatus and the like, the air tightness of the portion sealed to the insulation oil causes a problem due to the accelerated rotation speed produced when the support frame is rotated and there is a possibility that the dielectric strength is made insufficient by the mixture of air with the insulation oil leak. Furthermore, when the high voltage generator is mounted on such a moving support frame, the strength of a support member must be increased to cope with the heavy weight of the high voltage generator. In this viewpoint, a problem of increased size and weight of an entire system to be mounted on the support frame arises.

Still furthermore, since in the high voltage generator having the arrangement using the conventional insulation oil it is difficult to perfectly seal the insulation oil, it is usually designed to draw out a high voltage cable upwards.

SUMMARY OF THE INVENTION

An object of the present invention is to substantially eliminate or solve the problems or defects of the prior art described above and to provide a high voltage generator having a small size and a light weight.

Another object of the present invention is to provide a high voltage generator capable of sufficiently reflecting the merit of the reduction of the size and weight achieved by the use of a high frequency to the generator as a whole even if an inverter system is emplyed.

A further object of the present invention is to provide a high voltage generator by which the problem of lowering air tightness is not arisen by acceleration even if the apparatus is used by being mounted on a moving support frame such as the support frame of an X-ray CT apparatus.

A still further object of the present invention is to provide a high voltage generator by which the direction in which a high voltage cable is drawn out can be set in any arbitrary direction.

These and other objects can be achieved according to the present invention by a high voltage generator comprising:

a transformer means for boosting an inputted alternating current (AC) voltage; and a rectifier means for rectifying the AC voltage boosted by the transformer means, the transformer means and the rectifier means being assembled as high voltage components, wherein the high voltage components are molded by a solid insulation material with the high voltage components being separated from each other by a predetermined distance to thereby form the high voltage components to a single block member.

In a preferred embodiment, an electric conductive layer is formed on an outside surface of the block member. The electric conductive layer is formed by an evaporation of a metal material having an electric conductivity.

The high voltage generator is utilized for an X-ray generator and a direct current (DC) output generated from the rectifier means serves as a power supply for generating X-rays. A filament heating transformer is further disposed as a high voltage component for supplying an AC power for heating filaments of the X-ray tube.

The high voltage cable means is connected to an output side of the rectifier means and a portion of an end of the high voltage cable means on a rectifier means side is directly embedded in the solid insulation material. The solid insulation material is an epoxy resin, a phenol resin, a silicone resin, a urea resin or the like.

The AC voltage inputted into the transformer means has a frequency converted into a higher frequency. The rectifier means is a rectifier performing voltage doubler rectification. The block member is formed so as to provide substantially a box shape in which the high voltage components are molded.

According to the high voltage generator of the characters or structures described above, an input AC voltage is boosted and rectified and then taken out as a high DC voltage and supplied to, for example, an X-ray tube. At this time, the high voltage components are solidified to a single block member as a whole by a solid insulation material. Thus, the solid insulation material has a higher dielectric insulation oil and is used as the insulation member and an insulation distance can be shortened. Since the solid insulation material also serves as an inside supporting structure, the size and weight of the high voltage generator can be greatly reduced as compared with the conventional structure having the same electric characteristics. Furthermore, even if the high voltage generator is mounted on a rotary support frame or the like, the problem of air tightness due to acceleration is not caused because the solid insulation material is used. On the other hand, when the high voltage generator is used for the X-ray tube, a transformer for heating the filament of the X-ray tube can also be integrally made to a compact block. In addition, in the high voltage generator having high voltage cables embedded together, the exit ports of the cables are simplified, thus further reducing the size and weight of the generator.

BRIEF DESCRIPTION OF THE DRAWINGS

For a better understanding of the present invention and to show how the same is carried out, reference will be made hereunder, by way of a preferred embodiment, to the accompanying drawings, in which.

DESCRIPTION OF THE PREFERRED EMBODIMENT

An embodiment of the present invention will now be described with reference to FIGS. 1–4. In the embodiment, the high voltage generator is used for an X-ray tube similarly to the aforesaid prior art generator and the circuit arrangement thereof is assumed to be the same as that shown in FIG. 4 described above. For this reason, the same numerals are used for the same components.

Figure 1:
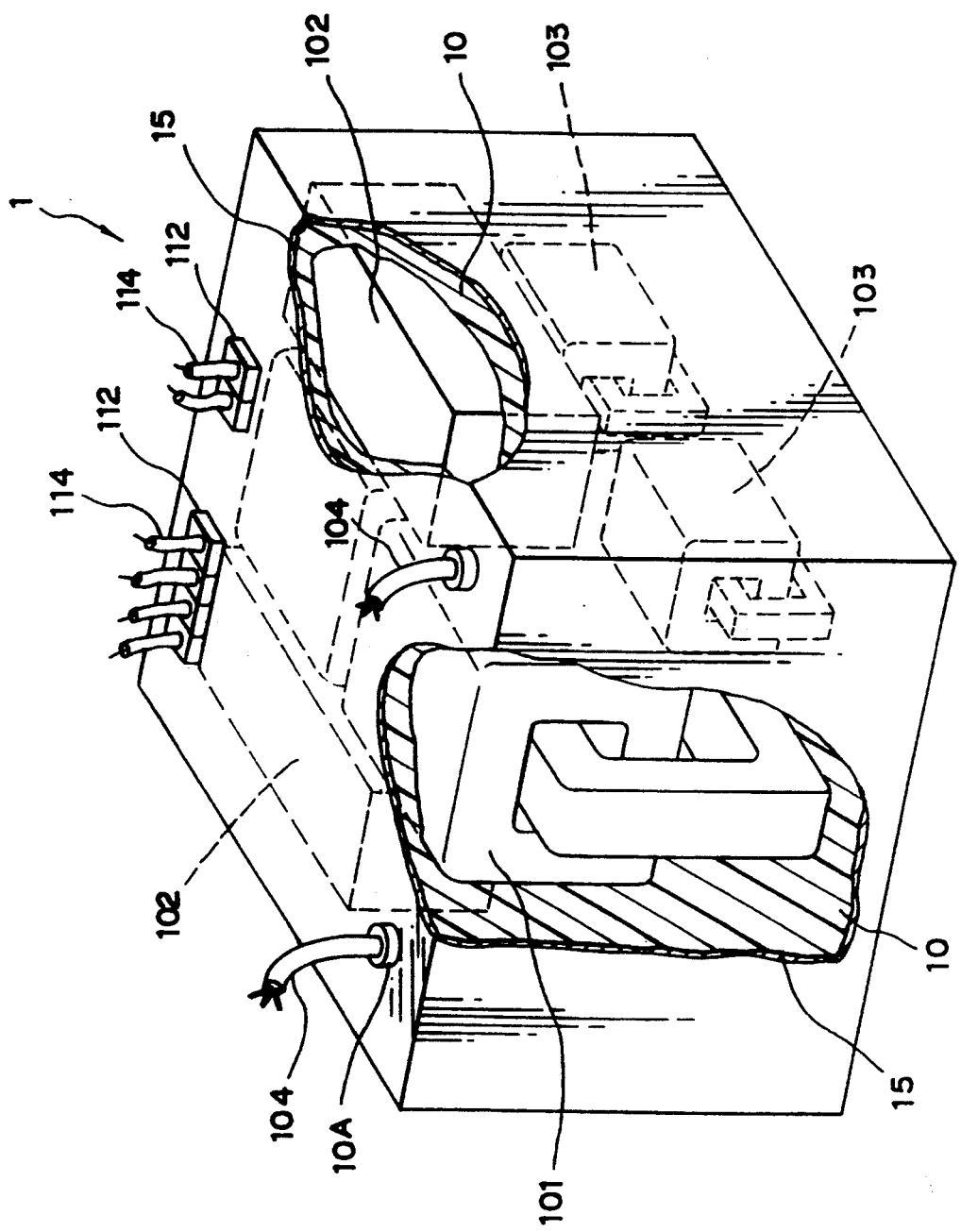
FIG. 1 is a perspective view, partially in cross section, of a high voltage generator according to an embodiment of the present invention.
Figure 2:
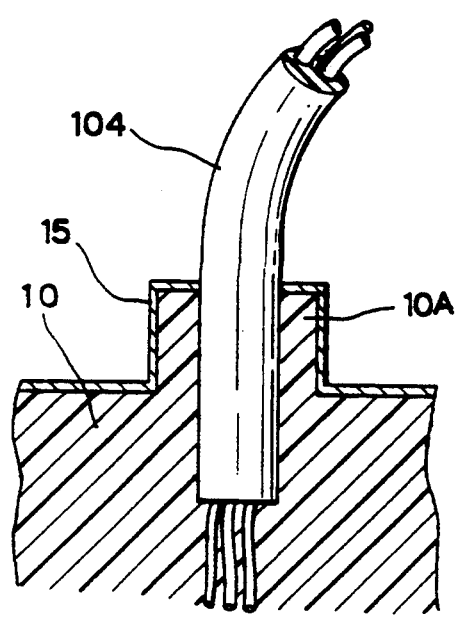
FIG. 2 is a partial cross sectional view of the drawn-out portion of a high voltage cable of the generator of FIG. 1.

FIG. 1 shows a high voltage generator 1 formed to a box-shaped single block member. This high voltage generator 1 is arranged such that the high voltage components shown in FIG. 4, that is, a high voltage transformer 101, a high voltage rectifier 102 (divided into two cases), a filament heating transformer (divided to two components) are integrally solidified to a box-shape by a solid insulation member 10. FIG. 2 shows the state that the exit port of each of high voltage cables 104 is solidified by a stepped-portion 10A formed by the solid insulation member 10 and also serves as a cable guide and reinforcing member.

Figure 3:
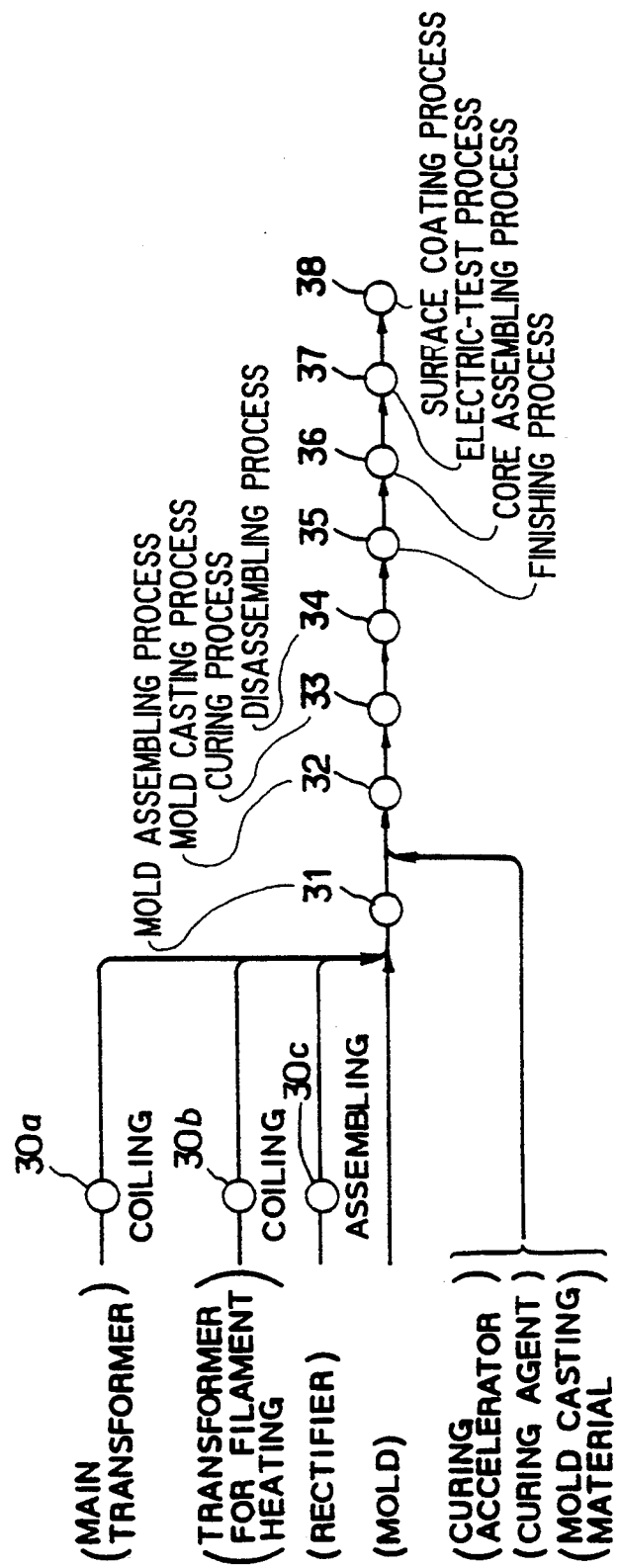
FIG. 3 is a flowchart for carrying out mold manufacturing processes.
Figure 4:
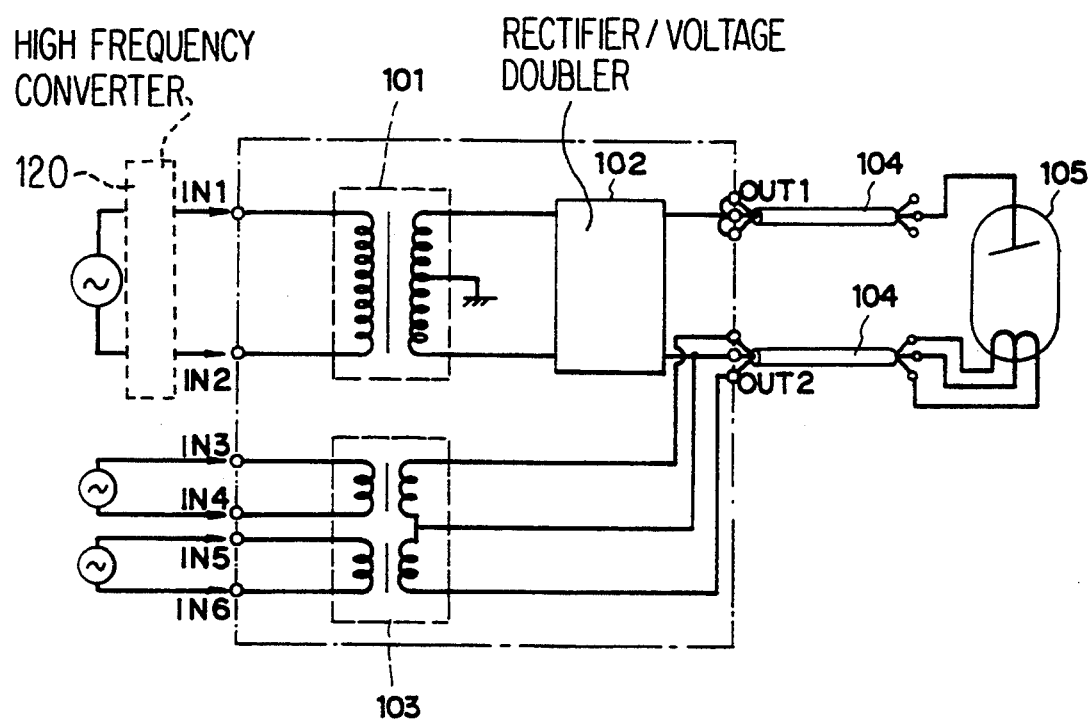
FIG. 4 is a circuit diagram of the main portion of the high voltage generator of the embodiment of the present invention and the prior art.
Figure 5:
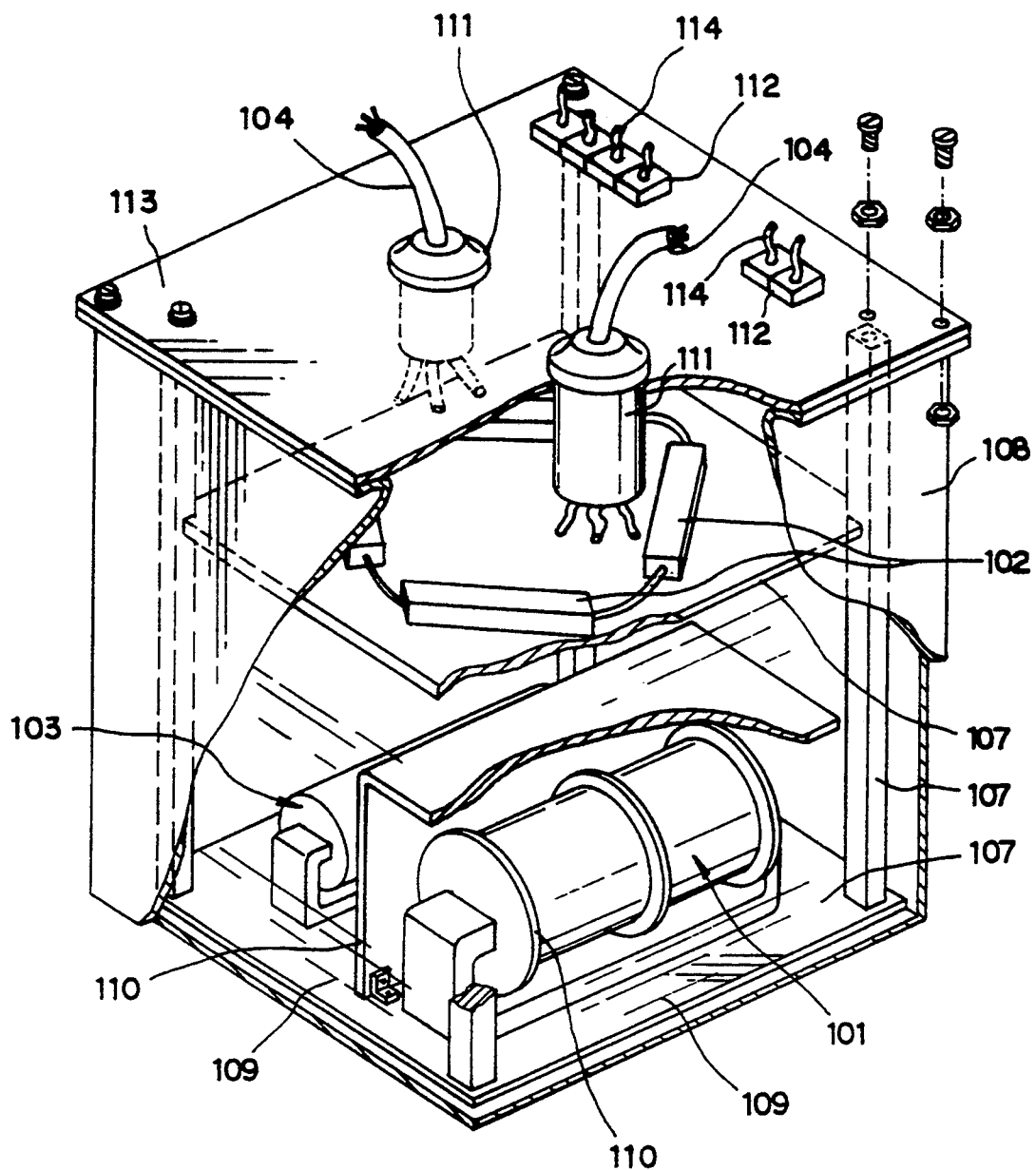
FIG. 5 is a perspective view, partially in cross section, of a high voltage generator of a conventional structure.

A process for making the high voltage generator 1 will be described with reference to FIG. 3. First, it is to be noted that assembly parts necessary to the high voltage transformer 101, the high voltage rectifier 102 for attaining voltage doubler rectification, a box-shaped metal mold, a mold casting material for forming the solid insulation member 10, a curing agent and a curing accelerator are prepared in advance. For the solid insulation member, there will be preferably provided an epoxy resin, a phenol resin, a silicone resin, a urea resin. Then, at preparation processes 30a and 30b shown in FIG. 3, the high voltage transformer 101 and the filament heating transformer 103 are independently made by cylindrically winding an insulation paper and wire around a winding frame a plurality of times. Since a resin impregnated paper is used as the insulation paper at the preparation processes 30a and 30b, these components are assembled after the insulation paper has been heated and dried in vacuum. Further, the high voltage rectifier 102 is assembled at another preparation process 30c carried out in parallel with the above processes.

The thus finished high voltage transformer 101, filament heating transformer 103, high voltage rectifier 102 and a separately prepared metal mold are gathered at the next manufacturing process 31 to carry out a mold assembly. At the mold assembly process 31, the respective high voltage components 101–103 must be positioned in the metal mold and supported at the positions. For this purpose, first, the respective high voltage components 101–103 are positioned by solid support members at positions so that they are spaced apart from each other by a minimum distance required for dielectric strength. The respective support members are formed of the same material as that of the mold casting material.

At this time, the respective components 101–103 are connected by wiring materials and terminals (a brass tap is formed to the outside thereof), low voltage cables 114 ... 114 are connected to the input terminal of the high voltage transformer 101 as shown in FIG. 1. The high voltage cables 104, 104 are connected to the output terminals of the rectifier 103. The respective low voltage cables 114 and high voltage cables 104 are positioned at predetermined positions. The high voltage cables 104, 104 are drawn out upwardly of the metal mold from the positions thereof, respectively, in the state that they stand upright. With this arrangement, the respective components 101–103 and the wiring materials are three-dimensionally disposed and fixed in the metal mold.

When the mold assembly process 31 is completed, a mold casting process 32 begins and the mold casting material, the curing agent and the curing acceleration agent are impregnated in the metal mold in a vacuum state. At this time, the molding material is cast to the end portions of the high voltage cables 104, 104 except the outer vinyl sheath and braided shield wire thereof.

Next, at a curing process 33, the respective cast materials are cured by heating the metal mold as a whole. Since the respective support members are made of the same material as that of the mold casing material, they are integrally cured at this curing process and made to the solid insulation member 10. Next, after cooled naturally, a cured box-shape block member is taken out from the metal mold at a disassembly process 34. The high voltage components 101–103 are integrally assembled in a fixed state in the block member as shown in FIG. 1.

Further, at finishing process 35, shaping is performed and terminal tables 112 ... 112 and the like are mounted. Furthermore, a core assembly process 36 such as tightening by a band or the like and an electric test process 37 such as the evaluation of the dielectric strength and the like are preformed. Thereafter, at a surface coating process 38, metal such as, for example, lead is vapor deposited or evaporated to the outside surface of the block member and thus an electric conductive layer 15 is formed as an outside coating and grounded.

According to the high voltage generator formed as described above, an AC low voltage supplied from the input terminals $IN_1$ and $IN_2$ in a circuit is boosted in accordance with a winding ratio and is then rectified and can be taken out form an output terminals $OUT_1$, and $OUT_2$ as a DC high voltage.

The high voltage generator 1 has various advantages over a generator made by a conventional method.

First, the size and weight of the generator can be greatly reduced as a whole even if a sufficient factor of safety is taken into consideration. This is because of that: first, since the solid insulation member 10 is used, a dielectric strength larger than that of conventional insulation oil can be obtained, by which an insulation distance between the respective high voltage components 101–103 and between the outside coating 15 , i.e. electric conductive layer, and them can be reduced as compared with the case in which the conventional insulation oil is used; second, since the interior of the block member is solidified by the solid insulation member 10, a barrier used in the conventional insulation oil is not needed to suppress the convection of floating dust; third, since the solid insulation member 10 also serves to support the high voltage components in the block member, conventionally necessary inner support members are not required; fourth, since the high voltage cables 104, 104 can be formed by being directly embedded in place of high voltage receptacles, a creeping distance necessary for a time when the high voltage receptacles are used is not needed, and at this time a distance necessary to embed the respective cables 104 can be adjusted to a minimum value remaining a distance for fixing the cable, and thus the size of one side of the three sides of the block member can be reduced; and fifth, the electric conductive layer 15 is formed in place of a ground of an iron vessel as in the conventional arrangement and thus the use of the heavy iron vessel can be eliminated.

The aforesaid advantages are combined as a whole and, as a result, the size and weight of the entire high voltage generator 1 are greatly reduced as compared with those of the conventional arrangement.

Further, the merit of the above reduction in size and weight can be reflected to the generator employing an inverter system. Although the size of a main transformer can be conventionally reduced due to the use of a high frequency by the inverter system, the reduction of the size and weight is limited. However, the size and weight of the inverter type high voltage generator can be greatly reduced by mixing the advantages of the present invention and the transformer having a small size and weight.

The application of the present invention to a high voltage generator resulted in experiments that the volume of the generator could be reduced to about $\frac{1}{4}$ to 1/10 that of a conventional high voltage generator having the same capacity, and the weight thereof could be reduced to about $\frac{1}{4}$ to 1/5 that thereof. Note, it is confirmed that electrical characteristics such as the waveform of a lamp voltage and the like and the inside thermal characteristics are not changed as compared with those of prior art even if the high voltage components are molded by the solid insulation material as described above.

Further, since the high voltage generator can be made to the small size and weight as described above, various secondary effects can be obtained. That is, the high voltage generator can be easily carried and an installation space can be greatly reduced, thus a corresponding apparatus to be supplied with a high voltage can be mounted together with the high voltage generator. In this case, the portion where this corresponding apparatus is mounted is not required to have a support member formed specially rigidly. As a result, the high voltage generator can be easily integrally assembled with an apparatus such as an X-ray CT apparatus having a rotary support frame.

Another important advantage is that even if the high voltage generator is mounted on a moving support frame such as the rotary support frame of the X-ray CT apparatus, since the interior of the block member is solidified by the solid insulation material 10, the conventional problem of lowering the dielectric strength of the insulation oil and the like is not caused by the air mixed to the oil even if the generator is moved together with the support frame. Furthermore, the insulation oil is not expanded or contracted and an air cover is not needed. Therefore, the leakage and insufficient dielectric strength of the oil are not caused when the oil is moved or vibrated or has an increased temperature, and thus the oil exhibits stable dielectric strength characteristics.

A further important advantage is that the direction in which the high voltage cables 104, 104 are taken out can be designed in any arbitrary direction. When the insulation oil is used as in the conventional generator, a problem arises in the limited strength and deterioration of the sealing of the closely contact portions of the high voltage receptacle of a cable with the vessel and of a ceiling plate with the vessel, and actually they cannot be perfectly sealed. Thus, the high voltage cable is usually taken out in a vertical direction. On the other hand, since the high voltage generator according to the present invention is solidified by the solid insulation material 10, the high voltage cables 104, 104 need not be vertically taken out and can be arbitrarily designed to be taken out in a horizontal direction, downward direction, and the like and a corresponding apparatus can be easily mounted.

In addition, according to the aforesaid embodiment, the following various advantages can be obtained. First, the reliability of the generator can be improved. That is, when an insulation oil is used, there is a possibility of causing insulation discharge and parts are damaged due to the deterioration of the insulation oil and the water content and dust in the insulation oil. In the generator according to the present invention, however, this possibility is greatly reduced and thus the reliability for dielectric strength is very much increased. Next, the problem of the leakage of the insulation oil is also solved and the insulation oil need not be replaced due to aged deterioration and thus a maintenance is made easy. Next, an iron vessel conventionally used as an oil tank is not needed and support members for inner structures also are not needed, so that the number of components can be reduced and thus a manufacturing cost is decreased as compared with a conventional structure. Further, a drying process and oil supplying process carried out in vacuum are omitted and a manufacturing efficiency is thus also improved.

Incidentally, when an inverter type high voltage generator is made, it can be arranged as a compact single body in such a manner that the respective units such as the circuit unit of an input power supply unit and the switching circuit of a high frequency inverter unit are mounted on a portion of the outer circumference of the generator according to the above embodiment, i.e., the outer circumference of a block member.

Note, the present invention is not limited to the case in which it is embodied as a power supply apparatus for the X-ray tube as in the above embodiment, but it may be used to other applications such as, for example, a laser apparatus, an ion implantation apparatus, a particle accelerator, and the like. The method of connecting the high voltage cable to the rectifier in the present invention is not limited to the direct embedding of the cable as in the aforesaid embodiment, but various methods may be employed such as, for example, the integral molding thereof including high voltage receptacles as in the prior art, the insertion of the plug connected to the high voltage cable into its receptacle, or the connection of the high voltage cable through a high voltage connecter mounted to a molded block member. Further, the block member is not limited to the box-shape

What is claimed is:

1. A high voltage generator comprising:
   a transformer means for boosting an inputted AC voltage; and
   a rectifier means for rectifying the AC voltage boosted by the transformer means, said transformer means and said rectifier means being assembled as high voltage components,
   wherein said high voltage components are molded by a solid insulation material with said high voltage components being separated from each other by a predetermined distance to thereby form said high voltage components to a single block member, and wherein an electric conductive layer is formed on an outside surface of said block member.

2. A high voltage generator according to claim 1, wherein said block member is formed so as to provide substantially a box shape in which said high voltage components are molded.

3. A high voltage generator according to claim 1, wherein said electric conductive layer is formed by an evaporation of a metal material having an electric conductivity.

4. A high voltage generator according to claim 1, wherein the high voltage generator is utilized for an X-ray generator and a DC output generated from said rectifier means serves as a power supply for an X-ray tube of the X-ray generator for generating X-rays.

5. A high voltage generator according to claim 4, further comprising a filament heating transformer as a high voltage component for supplying an AC power for heating filaments of the X-ray tube.

6. A high voltage generator according to claim 1, further comprising a high voltage cable means connected to an output side of said rectifier means and a portion of an end of said high voltage cable means on a rectifier means side is directly embedded in the solid insulation material.

7. A high voltage generator according to claim 6, wherein a drawn-out side of said high voltage cable means is formed stepwisely in said block member so as to enclose the high voltage cable means.

8. A high voltage generator according to claim 6, wherein said solid insulation material is an epoxy resin.

9. A high voltage generator according to claim 6, wherein said solid insulation material is a phenol resin.

10. A high voltage generator according to claim 6, wherein said solid insulation material is a silicone resin.

11. A high voltage generator according to claim 6, wherein said solid insulation material is an urea resin.

12. A high voltage generator according to claim 1, wherein the AC voltage inputted into said transformer means has a frequency converted into a higher frequency.

13. A high voltage generator according to claim 1, wherein said rectifier means is a rectifier performing voltage doubler rectification.

14. A high voltage generator comprising:
   a transformer for boosting an inputted AC voltage; and
   a rectifier for rectifying the AC voltage boosted by the transformer, said transformer and said rectifier being assembled as high voltage components,
   wherein said high voltage components are molded by a solid insulation material with said high voltage components being separated from each other by a predetermined distance to thereby form said high voltage components to a single block member, and wherein an electric conductive layer is formed on an outside surface of said block member.

15. A high voltage generator according to claim 14, wherein said block member is formed so as to provide substantially a box shape in which said high voltage components are molded.

16. A high voltage generator according to claim 14, wherein said electric conductive layer is formed by an evaporation of a metal material having an electric conductivity.

17. A high voltage generator according to claim 14, wherein the high voltage generator is utilized for an X-ray generator and a DC output generated from said rectifier serves as a power supply for an X-ray tube of the X-ray generator for generating X-rays.

18. A high voltage generator according to claim 17, further comprising a filament heating transformer as a high voltage component for supplying an AC power for heating filaments of the X-ray tube.

19. A high voltage generator according to claim 14, further comprising a high voltage cable connected to an output side of said rectifier and a portion of an end of said high voltage cable on a rectifier side is directly embedded in the solid insulation material.

20. A high voltage generator according to claim 19, wherein a drawn-out side of said high voltage cable is formed stepwisely in said block member so as to enclose the high voltage cable.

21. A high voltage generator according to claim 19, wherein said solid insulation material is an epoxy resin.

22. A high voltage generator according to claim 19, wherein said solid insulation material is a phenol resin.

23. A high voltage generator according to claim 19, wherein said solid insulation material is a silicone resin.

24. A high voltage generator according to claim 19, wherein said solid insulation material is a urea resin.

25. A high voltage generator according to claim 14, wherein the AC voltage inputted into said transformer has a frequency converted into a higher frequency.

26. A high voltage generator according to claim 14, wherein said rectifier is a rectifier performing voltage doubler rectification.

* * * * *